(12) United States Patent
Ahlback et al.

(10) Patent No.: US 7,782,788 B2
(45) Date of Patent: Aug. 24, 2010

(54) CHARGING IN A COMMUNICATIONS NETWORK

(75) Inventors: Hans Ahlback, Abo (FI); Harri Hakala, Turku (FI); Leena Mattila, Kaarina (FI)

(73) Assignee: Elefonaktibolaget L M Ericsson (Publ), Stockholm (SE)

( * ) Notice: Subject to any disclaimer, the term of this patent is extended or adjusted under 35 U.S.C. 154(b) by 1653 days.

(21) Appl. No.: 10/508,601

(22) PCT Filed: Mar. 26, 2003

(86) PCT No.: PCT/EP03/03144

§ 371 (c)(1),
(2), (4) Date: Sep. 22, 2004

(87) PCT Pub. No.: WO03/081843

PCT Pub. Date: Oct. 2, 2003

(65) Prior Publication Data

US 2005/0089020 A1 Apr. 28, 2005

(30) Foreign Application Priority Data

Mar. 27, 2002 (GB) ................................. 0207258.5

(51) Int. Cl.
*H04M 11/00* (2006.01)
(52) U.S. Cl. .................. 370/252; 370/338; 370/352; 370/401; 455/406
(58) Field of Classification Search .................. 370/328, 370/349, 352, 356, 469; 455/406, 419; 709/219, 709/230, 231, 245
See application file for complete search history.

(56) References Cited

U.S. PATENT DOCUMENTS

| 6,871,066 | B1 * | 3/2005 | Khullar et al. | 455/423 |
| 6,987,779 | B1 * | 1/2006 | Sevanto et al. | 370/469 |
| 7,079,519 | B2 * | 7/2006 | Lee et al. | 370/338 |

(Continued)

OTHER PUBLICATIONS

"Telecommunication Management; 3G Call and Event Data for the Packet Switche (PS) Domain (Release 1999)", 3GPP TS 32.015 v3.7.0, 3rd Generation partnership Projects; Technical Specification Group Services and Syste Aspects, (Online) Sep. 2001, XP002247272, Internet:, http//www.etsi.org, retrieved on Jul. 10, 2003, Chapter 5 and 6.1.6.5.

(Continued)

*Primary Examiner*—Chi H. Pham
*Assistant Examiner*—Shick Hom
(74) *Attorney, Agent, or Firm*—Roger S. Burleigh

(57) ABSTRACT

A method of charging a subscriber for using GPRS services provided by a mobile communications network. The method is based on including a flag in PDP activation or modification messages sent from a UE used by the subscriber to a GGSN of the network; the flag indicates whether the PDP context is to be used for signaling data or user data. The flag is examined within the network or at a node external to the network; if the flag indicates that the PDP context is to be used for carrying signaling data, a first charging regime is applied to the subscriber for establishing and using the context and, if the flag indicates that the PDP context is to be used for carrying user data, a different charging regime is applied to the subscriber for establishing and/or using the context.

5 Claims, 1 Drawing Sheet

U.S. PATENT DOCUMENTS

Figure 1:
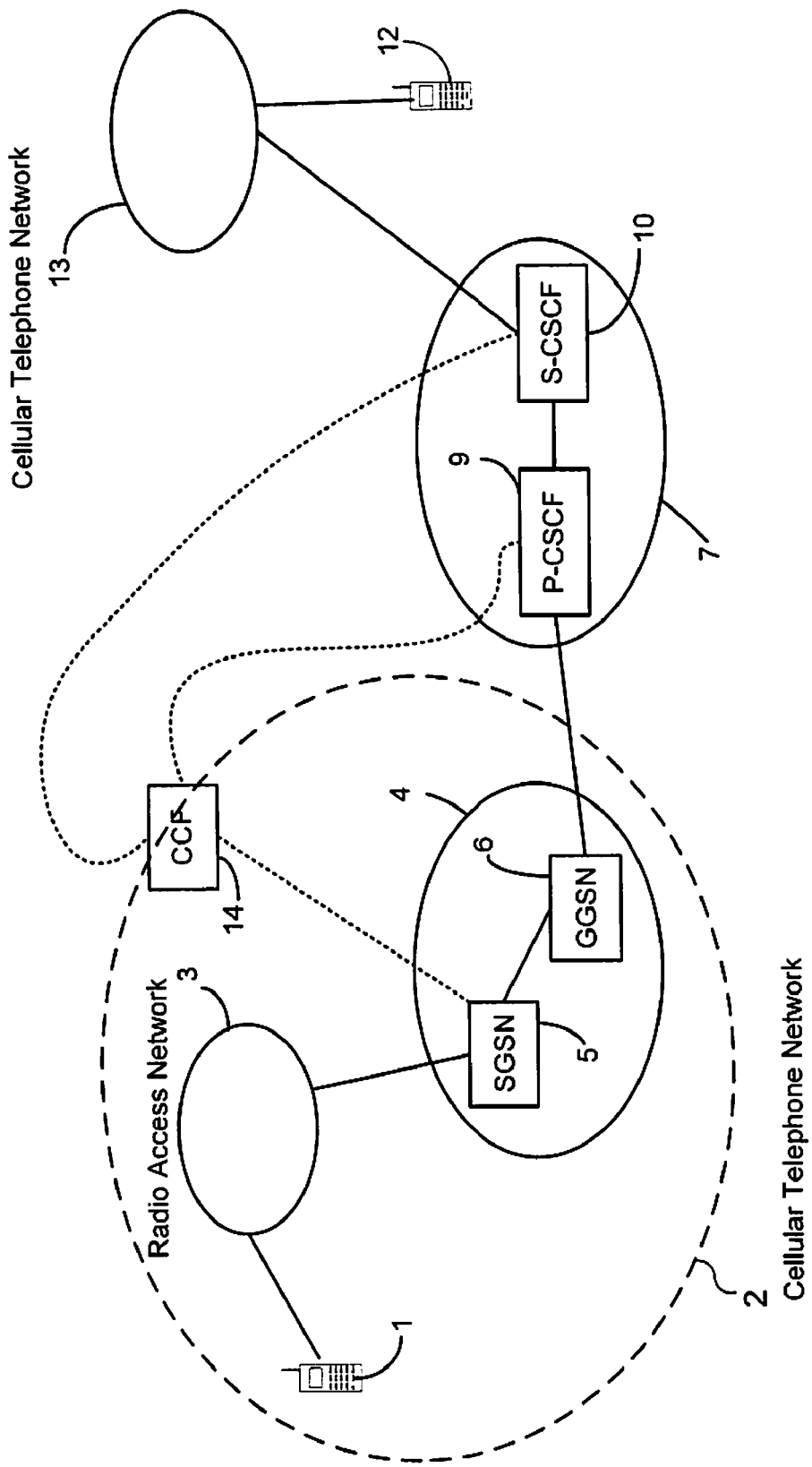

| | | | |
|---|---|---|---|
| 7,170,869 B2 * | 1/2007 | Yang et al. | 370/328 |
| 7,266,371 B1 * | 9/2007 | Amin et al. | 455/419 |
| 2001/0036175 A1 * | 11/2001 | Hurtta | 370/352 |
| 2001/0055298 A1 * | 12/2001 | Baker et al. | 370/349 |
| 2002/0012338 A1 * | 1/2002 | Uskela et al. | 370/352 |
| 2002/0068545 A1 * | 6/2002 | Oyama et al. | 455/406 |
| 2002/0147824 A1 * | 10/2002 | Hurtta et al. | 709/230 |
| 2002/0150084 A1 * | 10/2002 | Lee et al. | 370/352 |
| 2002/0191597 A1 * | 12/2002 | Lundstrom | 370/356 |
| 2003/0142643 A1 * | 7/2003 | Yang et al. | 370/328 |
| 2003/0156578 A1 * | 8/2003 | Bergenlid et al. | 370/352 |
| 2004/0028034 A1 * | 2/2004 | Greis | 370/352 |
| 2004/0037269 A1 * | 2/2004 | Lundin | 370/352 |
| 2004/0243720 A1 * | 12/2004 | Haumont et al. | 709/245 |
| 2004/0260791 A1 * | 12/2004 | Jerbi et al. | 709/219 |
| 2005/0047378 A1 * | 3/2005 | Wuschke et al. | 370/338 |
| 2005/0089020 A1 * | 4/2005 | Ahlback et al. | 370/352 |
| 2006/0168303 A1 * | 7/2006 | Oyama et al. | 709/231 |

OTHER PUBLICATIONS

"General Packet Radio Service (GPRS); GPRS Charging (GSM 12.15 version 7.5.0 Release 1998", ETSI TS 101 393 v7.5.0, Digital Cellular Telecommunications System (Phase 2+), Online Mar. 2000, XP002247273, Internet http//www.etsi.org, Retrieved on Jul. 10, 2003, Chapter 5.1-5.4.

"Technical Specification Group Services and System Aspects Service Aspects; Charging and Billing (Release 5)", 3GPP TS 22.115 5.1.0, 3$^{rd}$ Generalion Partnership Project, Online Jun. 2001, XP002247274, Internt http//www.etsi.org, Retrieved on Jul. 10, 2003, Chapter 3-5.

European Patent Office, International Search Report for PCT/EP03/03144, dated Jul. 10, 2003.

* cited by examiner

CHARGING IN A COMMUNICATIONS NETWORK

To facilitate fast data transfers to mobile terminals, packet switched data services are being introduced to digital cellular telephone networks. For example, the General Packet Radio Service (GPRS) is currently being introduced to many GSM networks. Unlike circuit switched connections, a GPRS connection (referred to as a PDP context) for a given user does not necessarily occupy one slot per frame on a given TDMA channel. Rather, slots are only used when the user has data to send or receive. When there is no traffic to transmit, no slots are allocated to the user. When there is a large volume of data to transmit, the user may be allocated one or more slots per frame. GPRS will be available in future third generation networks such as UMTS networks. The introduction of packet switched services, and the resulting availability of high data transfer rates, will allow network operators to increase the range of services available to subscribers as well as to improve already available services. For example, multimedia services such as videoconferencing and document sharing are likely to prove extremely popular.

To facilitate the provision of multimedia services, the 3$^{rd}$ Generation Partnership project (3GPP) has been developing a so-called IP Multimedia Core Network Subsystem (IMS). IMS communicates with the GPRS core network and contains all elements that are used to provide IP based multimedia services. For a mobile to mobile call, the IMS will sit between two GPRS core networks (assuming the mobiles belong to different networks). Certain nodes of the IMS may be owned by the operator of a first of the GPRS networks, with the remaining nodes being owned by the operator of the second network (some IMS nodes may be owned by a third party). The base protocol for multimedia services is the IETF Session Initiation Protocol (SIP). SIP makes it possible for a calling party to establish a connection to a called party even though the calling party does not know the current IP address of the called party, prior to initiating the call. SIP provides other functionality including the negotiation of connection parameters (e.g. Quality of Service and codecs).

The introduction of new services will provide operators with both opportunities and challenges when it comes to charging subscribers. Certain operators may decide to charge subscribers separately for using the GPRS access network (e.g. based on a charge per unit of data) and for using a service (e.g. based on a charge per unit time). However, it is more likely that operators will want to issue only a single charge for using a multimedia service, for example so as to be able to offer a lower total tariff which is less than the sum of the two separate tariffs. Charging information generated by the GPRS access network (at either a GGSN or a SGSN) will be identified using a GPRS charging identity, whilst charging information generated by the EMS will be identified using an IMS charging identity. The GPRS Charging Identity is transferred to the IP Multimedia System so that the IMS charging information can be correlated with the related GPRS access charging instance. Reference should be made to the 3GPP document 32.200.

Operators, who will offer IP Multimedia services according to the 3GPP architecture, have indicated that they want to charge according to GSM charging principles. This means, among other things, that the usage of the GPRS network should be based on time and Quality of Service (QoS). It also means that it must be possible to link the charging of the involved call components together, in order to be able to collect together all information on which GSM charging is based (time, locations of subscribers, type of service, type of terminating access, etc).

Within 3GPP, there has been a discussion about how to distinguish (within a GPRS system) a PDP context used for carrying signaling traffic and a PDP context used for carrying user data. This might be necessary because different quality of services may be made available to the two different data flows. For example, a PDP context used for carrying signaling data may be allocated a higher quality of service than a PDP context used for carrying user data A solution has been proposed which involves use of a flag in the PDP context activation message sent from the UE to the GGSN.

The inventors have addressed the problem of how to distinguish between PDP contexts (used for signaling and user data) to allow different charging regimes to be applied to each. For example, to provide PDP contexts for signaling data free of charge, whilst charging for PDP contexts used for user data. They have realized that a flag can be included in the PDP context activation or modification messages sent from the UEs to the GGSNs, i.e. the same mechanism discussed within 3GPP. The novelty of the new proposal is the use of that flag to make a charging decision.

According to the present invention, there is provided a method of charging a subscriber for using GPRS services provided by a mobile communications network. The method is based on including a flag in PDP activation or modification messages sent from a UE used by the subscriber to a GGSN of the network; the flag indicates whether the PDP context is to be used for signaling data or user data. The flag is examined within the network or at a node external to the network; if the flag indicates that the PDP context is to be used for carrying signaling data, a first charging regime is applied to the subscriber for establishing and using the context and, if the flag indicates that the PDP context is to be used for carrying user data, a different charging regime is applied to the subscriber for establishing and/or using the context.

In a preferred embodiment of the invention, flags contained in PDP activation or modification messages are verified at the receiving GGSN to verify their authenticity. This is necessary because the messages originate at a UE where there is a potential for fraudulent intervention by the user. Once verified, the flag contained in a message may be distributed to nodes having charging responsibility (e.g. SGSN).

FIG. 1 illustrates schematically a typical scenario where User Equipment (UE) 1 is a subscriber of a cellular telephone network 2. The subscriber using the UE is identified in the network 2 by a unique subscriber identity. The cellular telephone network comprises a Radio Access Network 3 and a General Packet Radio Service (GPRS) network 4 (as well as a circuit switched core network which is not illustrated in FIG. 1). Within the GPRS network 4, two nodes relevant to the UE 1 can be identified.

These are the Serving GPRS Support node (SGSN) 5 and the Gateway GPRS Support Node (GGSN) 6. The role of the SGSN 5 is to maintain subscription data (identities and addresses) and to track the location of the UE within the network. The role of the GGSN 6 is to maintain subscription information and allocated IP addresses and to track the SGSN to which the UE 1 is attached. The GGSN 6 is coupled to an IP network. Typically, when the UE 1 is turned on it "attaches" itself to the GGSN and one or more PDP contexts are established between the UE 1 and the GGSN 6. The context provide "pipes" for transporting data from the UE 1 to the GGSN 6. This process involves the allocation of an IP address to the UE 1.

Also illustrated in FIG. 1 is an IP Multimedia Core Network Subsystem (IMS) 7 which contains all of the elements required to provide IP based multimedia services. The functionality provided by the IMS 7 is set out in 3GPP TS 23.228. The IMS 7 consists of a set of nodes which are coupled to an IP backbone network. This network is also connected to the GGSN 6 of the GPRS network 4. Illustrated within the IMS 7 are a proxy call state control function (P-CSCF) node 9 and a serving call state control function (S-CSCF) node 10. It is assumed here that the IMS is owned by the operator of the cellular telephone network 2 (although this need not be the case).

The S-CSCF 10 performs the session control services for the UE, and maintains a session state as needed by the network operator for support of services. The main function performed by the S-CSCF 10 during a session is the routing of incoming and outgoing call set-up requests. The main function performed by the P-CSCF 9 is to route SIP messages between the UE and the home network.

A multimedia connection usually requires at least two sessions at the bearer level (in GPRS two PDP contexts). one for the call/session control signalling signaling and other(s) to transport the user plane. From a charging point of view, these are independent sessions on the bearer level, and will be charged separately. That is, the end-user can be charged for the data volume that is generated by the control signaling (e.g. SIP) itself and for the data transported in the user plane.

It is foreseen that the operators will want to charge for the bearer used for signaling differently than that used for data transfer in the user plane. However as yet there is no clear method in the bearer level charging mechanism to separate the different types of bearers. One solution is to use specific Access Point Names (APNs) for the PDP contexts used for the SIP signaling. However, this solution requires the charging system to have a detailed knowledge of the network configurations (not only of the home network, but also of the visited networks which the operator has roaming agreements with). From an administration point of view, this is not a feasible solution in large networks.

3GPP is standardizing a Signaling Flag parameter for QoS purposes in the GPRS access protocols. This will allow different bearers to be allocated different levels of service (e.g. different bandwidths). In order to differentiate the PDP contexts used for the application level signaling and for the payload transfer this Signaling Flag parameter can be added in the online protocol used for subscriber charging (e.g. CAMEL Application Part (CAP) operation InitialDPGPRS in GPRS or in the Diameter Accounting Request message) and in the charging records produced by network elements, e.g. SGSN.

Typically, the flag is set in the PDP context activation or modification message (for the signaling context) which is sent from the UE 1 to the GGSN 6 using the GTP protocol. The flag can be propagated back from the GGSN 6 to the SGSN 5 using e.g. the GTP message "Create PDP Context Response". Furthermore, the Signaling Flag shall be distributed to all network elements involved in charging.

Illustrated in FIG. 1 is a UE 12 belonging to a subscriber referred to below as the B-subscriber. The UE 12 is attached to its own network 13. This network may consist of a RAN, GPRS network and IMS network, mirroring the networks used by the UE 1. The A-subscriber may establish for example a multimedia call to the B-subscriber using known mechanisms, once a signaling PDP context has been established.

As already discussed above, real-time charging messages (e.g. using CAP or Diameter protocol) may be generated within the GPRS access network 4. In particular, the SGSN 5 or GGSN 6 may generate real-time charging messages for a given connection. The real-time charging messages generated by the SGSN 5 or GGSN 6 may relate to the volume of data sent during the call. Typically, all real-time messages associated with the call are sent to a Charging Control Function 14 (CCF) e.g. Online Charging Function, belonging to the operator of the cellular telephone network 2. For the call in question (i.e. from the UE 1 to the UE 12), real-time charging messages will be generated by the GPRS access network 4.

Once the signaling PDP context has been established, the SGSN 5 and GGSN 6 will have received the appropriate Signaling Flag indicating to them that the PDP context in question relates to signaling. The flag is incorporated into the charging messages (e.g. CAP operation InitialDPGPRS or Diameter Accounting Request message) sent to the OCS for this context and in Charging Data Records. The OCF and/or the Billing System include intelligence to determine the setting of the flag and to charge (or not charge) the subscriber accordingly. For PDP contexts subsequently established for carrying user plane data, the Signaling Flags propagated to the various charging nodes. (SGSN and GGSN) will not be set. Charging messages sent to the OCF from these nodes will contain this information and the OCF can charge for the contexts accordingly.

It will be appreciated by the person of skill in the art that various modifications may be made to the above described embodiments without departing from the scope of the present invention.

The invention claimed is:

1. A method of charging a subscriber for using General Packet Radio Service (GPRS) services provided by a mobile communications network, said method comprising the steps of:

including in packet data protocol (PDP) activation or modification messages sent from a user equipment (UE) used by a subscriber to a Gateway GPRS Support Node (GGSN) of the network, a flag indicating whether the PDP context is to be used for signaling data or user data; and, examining said flag within the network or at a node external to the network, and if the flag indicates that the PDP context is to be used for carrying signaling data, applying a first charging regime to the subscriber for establishing and using the context, and if the flag indicates that the PDP context is to be used for carrying user data, applying a different charging regime to the subscriber for establishing and/or using the context;

wherein said flag is included in session/traffic control messages sent between network elements involved in charging to indicate whether the PDP context is to be used for signaling data or user data.

2. A method of charging a subscriber for using General Packet Radio Service (GPRS) services provided by a mobile communications network, said method comprising the steps of:

including in packet data protocol (PDP) activation or modification messages sent from a user equipment (UE) used by a subscriber to a Gateway GPRS Support Node (GGSN) of the network, a flag indicating whether the PDP context is to be used for signaling data or user data; and, examining said flag within the network or at a node external to the network, and if the flag indicates that the PDP context is to be used for carrying signaling data, applying a first charging regime to the subscriber for establishing and using the context, and if the flag indicates that the PDP context is to be used for carrying user data, applying a different charging regime to the subscriber for establishing and/or using the context;

wherein said first charging regime results in a specific charge or no charge being made to the subscriber's account and said second charging regime results in a different charge being made to the subscriber's account.

3. The method according to claim 1, wherein said GGSN verifies the flag in received activation messages for security purposes, and forwards the flag to a Serving GPRS Support Node (SGSN).

4. A method of charging a subscriber for using General Packet Radio Service (GPRS) services provided by a mobile communications network, said method comprising the steps of:

including in packet data protocol (PDP) activation or modification messages sent from a user equipment (UE) used by a subscriber to a Gateway GPRS Support Node (GGSN) of the network, a flag indicating whether the PDP context is to be used for signaling data or user data;

examining said flag within the network or at a node external to the network, and if the flag indicates that the PDP context is to be used for carrying signaling data, applying a first charging regime to the subscriber for establishing and using the context, and if the flag indicates that the PDP context is to be used for carrying user data, applying a different charging regime to the subscriber for establishing and/or using the context; and, including the signaling flag in Charging Data Records generated in network elements.

5. A method of charging a subscriber for using General Packet Radio Service (GPRS) services provided by a mobile communications network, said method comprising the steps of:

including in packet data protocol (PDP) activation or modification messages sent from a user equipment (UE) used by a subscriber to a Gateway GPRS Support Node (GGSN) of the network, a flag indicating whether the PDP context is to be used for signaling data or user data;

examining said flag within the network or at a node external to the network, and if the flag indicates that the PDP context is to be used for carrying signaling data, applying a first charging regime to the subscriber for establishing and using the context and if the flag indicates that the PDP context is to be used for carrying user data, applying a different charging regime to the subscriber for establishing and/or using the context; and, including the signaling flag in real-time charging messages sent towards an Online Charging Function.

* * * * *

UNITED STATES PATENT AND TRADEMARK OFFICE
CERTIFICATE OF CORRECTION

| | | |
|---|---|---|
| PATENT NO. | : 7,782,788 B2 | Page 1 of 1 |
| APPLICATION NO. | : 10/508601 | |
| DATED | : August 24, 2010 | |
| INVENTOR(S) | : Ahlback et al. | |

It is certified that error appears in the above-identified patent and that said Letters Patent is hereby corrected as shown below:

On Page 2, item (56), under "OTHER PUBLICATIONS", in Column 2, Line 8, delete "Generalion" and insert -- Generation --, therefor.

In Column 1, Line 55, delete "EMS" and insert -- IMS --, therefor.

In Column 3, Line 21, delete "context)." and insert -- context), --, therefor.

In Column 3, Line 22, after "control" delete "signalling".

In Column 4, Line 23, delete "nodes." and insert -- nodes --, therefor.

Signed and Sealed this
Fifteenth Day of March, 2011

David J. Kappos
*Director of the United States Patent and Trademark Office*